June 14, 1927.  
E. VON SCHUBERT  
1,632,770  
DEVICE FOR TAKING PHOTOGRAPHS  
Filed Oct. 28, 1924  
2 Sheets-Sheet 1
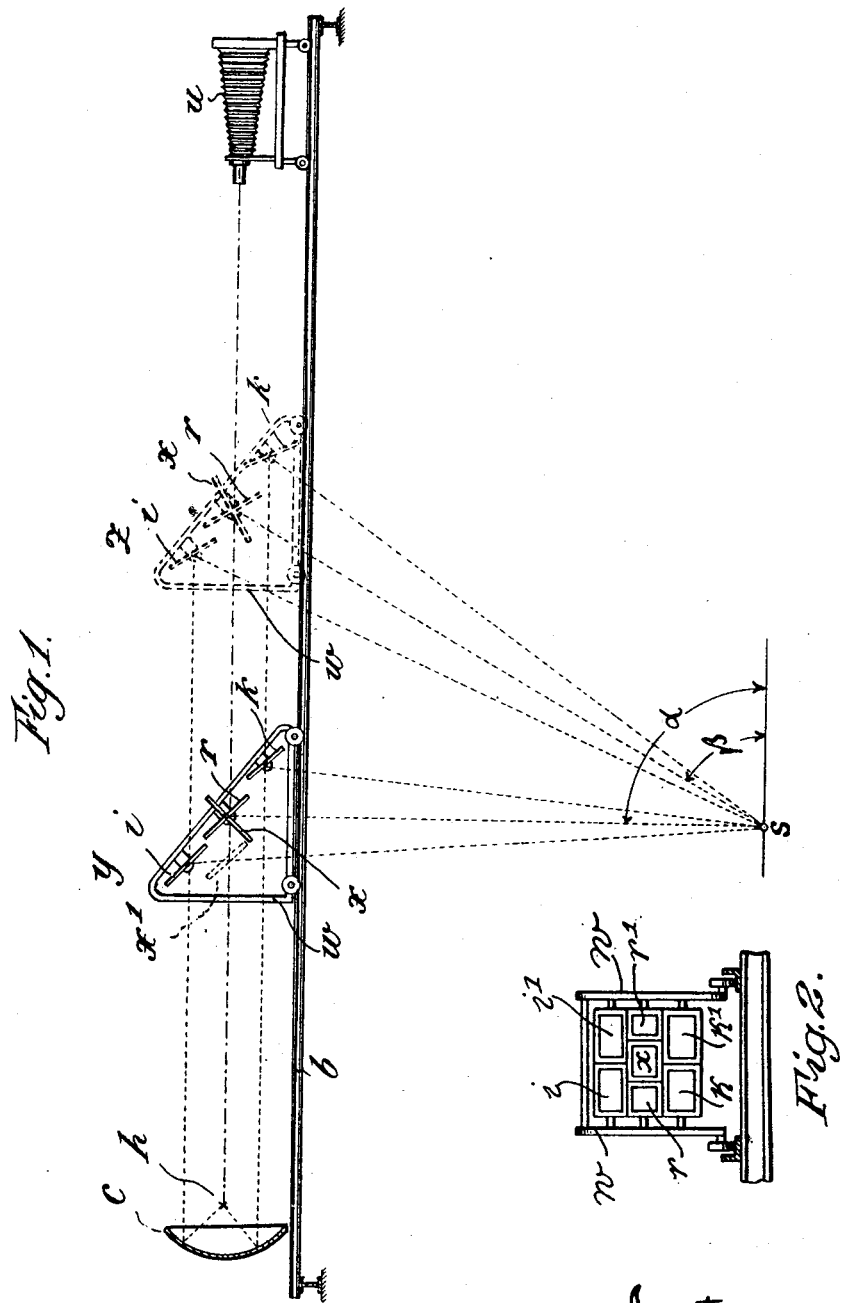
Inventor  
Erich von Schubert June 14, 1927.
E. VON SCHUBERT
DEVICE FOR TAKING PHOTOGRAPHS
Filed Oct. 28, 1924
2 Sheets-Sheet 2
1,632,770
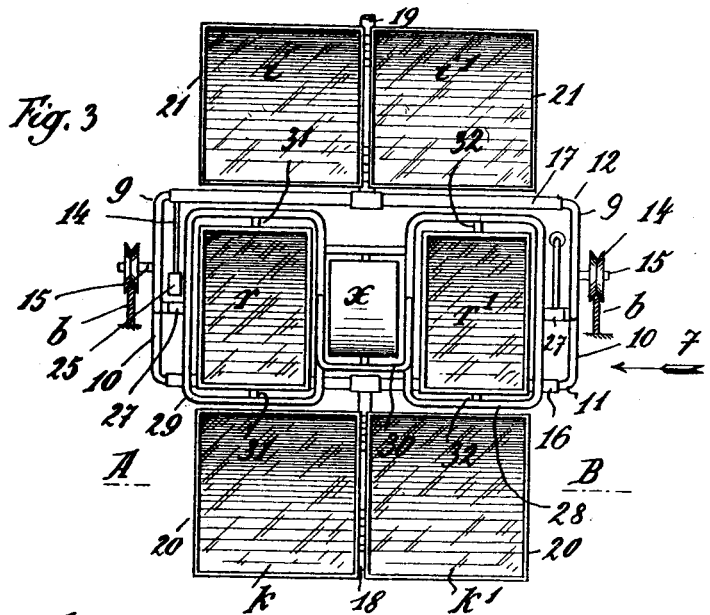
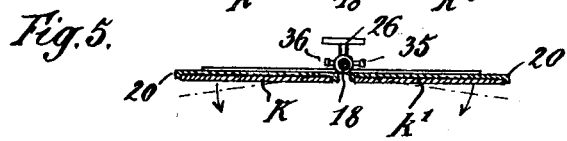
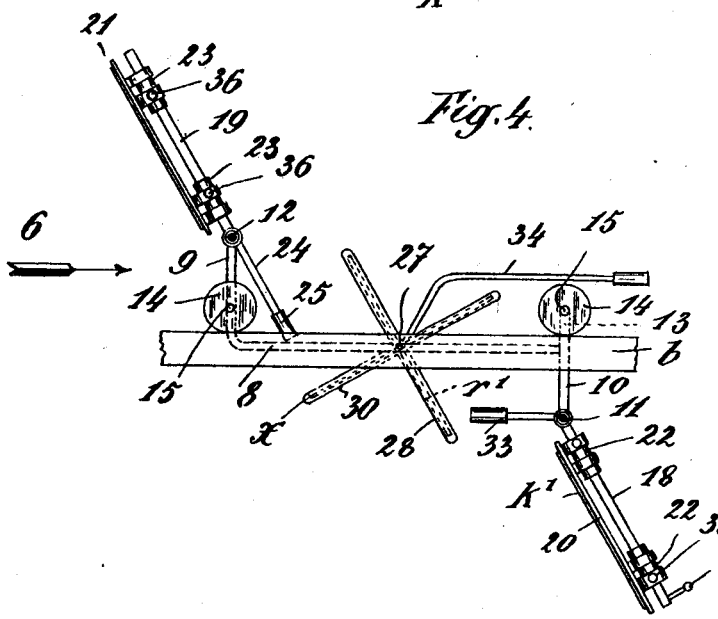
Inventor
Erich von Schubert
By Knight Bros
attys.

Patented June 14, 1927.

1,632,770

UNITED STATES PATENT OFFICE.

ERICH VON SCHUBERT, OF BERLIN, GERMANY, ASSIGNOR TO ASKANIA-WERKE AKTIENGESELLSCHAFT VORMALS CENTRALWERKSTATT DESSAU UND CARL BAMBERG-FRIEDENAU, OF BERLIN-FRIEDENAU, GERMANY.

DEVICE FOR TAKING PHOTOGRAPHS.

Application filed October 28, 1924, Serial No. 746,430, and in Germany October 30, 1923.

This invention relates to an arrangement or device for taking photographs.

For taking photographs of any proceeding or occurrence such as, for instance, operations, parturitions of man or beast, the issuing of insects, the doings especially of shy and wild beasts, the motions of a dancer and the like, it is mostly very difficult or nearly impossible to focus the camera and to adjust it for one definite occurrence or act because the scene frequently changes like a kaleidoscope, and each displacement of the camera will require a new focussing which by no means can be performed as quickly as the object scenes change.

The present invention comprises means for suitably taking such photographs without difficulty, the object being unable to perceive the person taking the photograph nor the arrangement used, which, specially in view of shy beasts, may be of great importance.

According to this invention, the camera being relatively stationary, a taking mirror is connected with a movable lighting mirror in such a manner that when the object is illuminated, the image thereof is directed by the taking mirror into the optic axis of the camera so that the object or the portion thereof to be taken, comes into the midst of the image area. Therefore, by adjusting the illumination mirror the taking mirror also is automatically brought into the right position. If the object is to be illuminated by means of an artificial source of illumination or by concentrated light, the illumination mirror can serve for directing the light onto the object. If the object or the respective portion thereof is illuminated, one forthwith knows that because the taking mirror is moved together with the illumination mirror, the image of the illuminated object or portion thereof is in the midst of the image field. However, if one operates with an artificial source of scattered light or daylight, an auxiliary source of coloured light may be used for searching or illuminating the object, which auxiliary light is directed to the object by means of the illuminating mirror. This coloured light or the coloured ray of light directed onto the object makes it understood whether the taking mirror is in the right position. If magnesium light is to be used, a faint glim of light whether white or coloured, is directed to the object by means of the illuminating mirror which may be designated as searcher, and if the object is hit by this ray of light, the magnesium light can be made to act whereby the illuminated object is brought by way of the taking mirror into the midst of the image field as reproduction.

It does not influence the essential features of the present invention whether the arrangement or device as described above is used for producing immovable or serial pictures.

In the annexed drawing, by way of example, Fig. 1 is a diagrammatic representation of the construction for an operating room, Fig. 2 shows the system of mirrors seen in the direction from the source of light, Fig. 3 is a front elevation of an embodiment of the invention taken in the direction of the arrow 6 of Fig. 4. Fig. 4 is a side elevation taken in the direction of the arrow 7 of Fig. 6, and Fig. 5 is a cross section taken on the line A—B of Fig. 3.

I will refer first to the diagrammatic views 1 and 2, and then describe the specific embodiment of the invention illustrated in Figs. 3, 4 and 5. It is assumed that the object of operation shall be illuminated by means of an artificial source of light, and that one pair of the mirrors shall serve for illuminating the object, this pair of mirrors being fixedly connected to the taking mirror.

A concave mirror $c$ casts the light of the artificial source of light $h$ towards the illuminating mirrors $i$ $i^1$, $k$ $k^1$ and $r$ $r^1$ which can be adjusted each about a horizontal axis, and which besides can be turned rooflike towards each other, in order to focus all the pencils of rays in the object-point $s$, together with the middle ray incident at an angle $\alpha$. On the horizontal axis of the mirror-pair $r$ $r^1$ is mounted a taking mirror $x$ preferably shaped in the form of a plane mirror. All the mirrors can be jointly arranged in a frame $w$ running on rails $b$ upon which the photographic camera $u$ may also be movably placed. The taking mirror $x$ is situated perpendicularly to the illuminating mirrors $r$ $r^1$. If the object is to be illuminated and to be taken at another angle (for instance angle $\beta$) than resulting from the position $y$, for example by putting the mirror arrangements into the position $z$, all the illuminating mirrors are adjusted so that the rays again join in the object. By adjusting the mirror-pair $r$ $r^1$ and thereby at the same time adjusting the taking mirror $x$ the light rays issuing from the latter are caused to run again in the optic axis. Thereby, also in this position of the illuminating and of the taking mirrors, the object will appear in the diagonal centre of the mat-plate.

The embodiment illustrated in Figs. 3, 4 and 5 will now be described. The carriage is made of pipes 8 to 13 inclusive in order to reduce the weight as much as possible. The pipes are so bent that the parts 9 and 12 form an upwardly projecting frame, ly projecting frame. The side pipes 10 protrude while the parts 10 and 11 form a downwardly project upwardly above the pipes 8 to form extensions 13 which can be seen in Fig. 4. The side pipes 9 and the extensions 13 of the pipes 10 carry pins 15 upon which are mounted rollers 14 adapted to run upon the tracks $b$. The frame parts 11 and 12 carry rotatable pipes 16 and 17 respectively and with these pipes the rods or pipes 18 and 19 respectively are rigidly connected. Each of these rods 18 and 19 carries two swingable plates 20 and 21 which are adapted to be swung and tilted roof like toward each other upon the hinges 22 and 23 respectively on the rods 18 and 19, as shown in dotted lines in Fig. 5. On their forward sides the plates 20 carry the two lower mirrors $k$, $k^1$, the plates 21, the two upper mirrors $i$, $i^1$. The upper pipe 17 is provided with an arm 24 on which may be mounted a counterweight 25, while the pipe 16 carries a counterweight 33, and the downwardly directed rod 18 carries a handle 26. Each pair of mirrors $i$, $i^1$ and $k$, $k^1$ can be tilted roof like toward each other, and can be rotated with respect to the horizontal on the frame parts 12 and 11, so that the beams coming from the reflector $c$ will converge upon the object.

In the two horizontal frame members 8, of which one can be seen in Fig. 4, two closed quadrangular frames 28 and 29 are rotatable upon pins 27. A space is left between the two frames 28 and 29 for a frame 30 which stands at right angles to the frames 28 and 29 and is rigidly connected to the same, for example by autogenic soldering. The mirror $r$ is rotatably mounted in the frame 29 upon vertical pins 31, and the mirror $r^1$ is rotatably mounted in frame 28 upon pins 32, whereby both mirrors can be turned roof like toward each other so that the beams of light coming from the reflector $c$ will converge upon the object $s$. On the other hand, the mirror $x$ is mounted in frame 30 with its reflecting side toward the camera, that is to say, it is adapted to direct the beams of light coming from the object into the objective of the camera, as described in the first part of the specification. A lateral lever 34 may be connected to the mirror frames 28, 29 and 30 carrying the mirrors $r$, $r^1$ and $x$.

The adjustment of all the mirrors may be accomplished by means of a rod, or equally as well by hand.

In order to prevent the pairs of mirrors $i$, $i^1$ and $k$, $k^1$ from gravitating toward each other the hinges 22 and 23 may be provided with set screws 35 and 36 which engage the rods 18 and 19 respectively. The tubes 16 and 17 are tight enough on the frame members 11 and 12 so that a gravitation of the mirrors about the horizontal axis cannot occur. In any case it has been found in practice that the friction of the pipes upon the frame is sufficient to prevent such gravitation.

What I claim is:

1. A device for focusing a camera on an object comprising rotatable means for projecting a beam of light toward said object, and a reflector rotatable with said light projecting means for directing rays of light proceeding from the object into the camera.

2. A device for taking photographs comprising in combination a camera, means for projecting rays of light toward the camera parallel to the optic axis thereof, a mirror mounted for rotation on an axis perpendicular to the optic axis of the camera, and adapted to be turned to direct a beam of light from said source of light onto an object, and a second mirror fixed to the first at right angles thereto, whereby when the beam of light from the first mirror strikes the object, light from the object will be directed by the second mirror into the camera.

3. A device for taking photographs comprising a camera, means for projecting rays of light toward the camera parallel to the optic axis thereof, a pair of mirrors between said light projecting means and said camera, said mirrors being angularly adjustable on an axis perpendicular to the optic axis of the camera, and also tiltable toward each other, and a third mirror fixed at right angles to the first two mirrors and between them for the purpose described.

4. A device for taking photographs in accordance with claim 3 in combination with angularly adjustable auxiliary mirrors adjacent the first mentioned mirrors and in the path of the projected rays of light, for directing additional light onto the object.

5. A device for taking photographs comprising a camera, means for projecting rays of light toward the camera parallel to the optic axis thereof, a carriage between said light projecting means and said camera movable parallel to the optic axis of the camera, a pair of mirrors mounted on said carriage, said mirrors being angularly adjustable about an axis perpendicular to the optic axis of the camera, and being also tiltable toward each other, and a third mirror fixed at right angles to the first two mirrors and between them for the purpose described.

The foregoing specification signed at Berlin, Germany, this 13th day of October, 1924.

Dr. Med. ERICH v. SCHUBERT.